US009234096B2

(12) United States Patent  
Morizur et al.

(10) Patent No.: US 9,234,096 B2
(45) Date of Patent: Jan. 12, 2016

(54) COLOR AND HEAT STABLE POLYCARBONATE COMPOSITIONS AND METHODS OF MAKING

(75) Inventors: Jean-Francois Morizur, Evansville, IN (US); Yaming Niu, Shanghai (CN); Thomas Evans, Mount Vernon, IN (US)

(73) Assignee: SABIC GLOBAL TECHNOLOGIES B.V., Bergen Op Zoom (NL)

(*) Notice: Subject to any disclaimer, the term of this patent is extended or adjusted under 35 U.S.C. 154(b) by 730 days.

(21) Appl. No.: 13/020,617

(22) Filed: Feb. 3, 2011

(65) Prior Publication Data

US 2012/0202034 A1  Aug. 9, 2012

(51) Int. Cl.
```
C08L 69/00      (2006.01)
C08K 5/524      (2006.01)
C08K 5/527      (2006.01)
C08K 5/134      (2006.01)
C08K 5/5435     (2006.01)
```

(52) U.S. Cl.
CPC ............. *C08L 69/00* (2013.01); *C08K 5/134* (2013.01); *C08K 5/524* (2013.01); *C08K 5/527* (2013.01)

(58) Field of Classification Search
None
See application file for complete search history.

(56) References Cited

U.S. PATENT DOCUMENTS

| 4,066,611 A | 1/1978 | Axelrod |
| 5,668,204 A * | 9/1997 | Meier et al. .................. 524/267 |
| 6,462,111 B1 | 10/2002 | Singh |
| 2002/0040081 A1 * | 4/2002 | Stein et al. .................... 524/121 |
| 2003/0158306 A1 * | 8/2003 | Battiste et al. ................ 524/128 |
| 2007/0191519 A1 | 8/2007 | Jiao et al. |
| 2008/0081860 A1 * | 4/2008 | Li et al. ........................ 524/414 |

FOREIGN PATENT DOCUMENTS

| JP | 10101944 A * | 4/1998 |
| JP | H10-101944 A | 4/1998 |
| WO | 01/98402 A1 | 12/2001 |
| WO | 2008/127424 A1 | 10/2008 |

OTHER PUBLICATIONS

Irgafos 168 Technical Data Sheet. Ciba Corp. 1999.*
Doverphos S-9228 Technical Data Sheet. Dover Chemical Corporation. 2012.*
Machine Translation of JP 10-101944A. Apr. 21, 1998.*
4-Hydroxybenzoic Acid Entry. Combined Chemical Dictionary, CHEMnetBASE.com, as viewed on Jul. 30, 2013.*
Patial Written Translation of JP 10-101944 A. Apr. 21, 1998.*

* cited by examiner

*Primary Examiner* — Robert C Boyle
*Assistant Examiner* — Stephen Reith
(74) *Attorney, Agent, or Firm* — Michael Best & Friedrich LLP

(57) ABSTRACT

Provided herein are branched polycarbonate resin compositions The compositions include a first heat stabilizer, a second heat stabilizer, a branched polycarbonate, a cyclic siloxane, and a flame retardant salt. The compositions withstand discoloration and increased melt viscosity when exposed to elevated temperatures. These compositions are useful in the manufacture of various shaped, formed and/or molded articles.

22 Claims, 1 Drawing Sheet

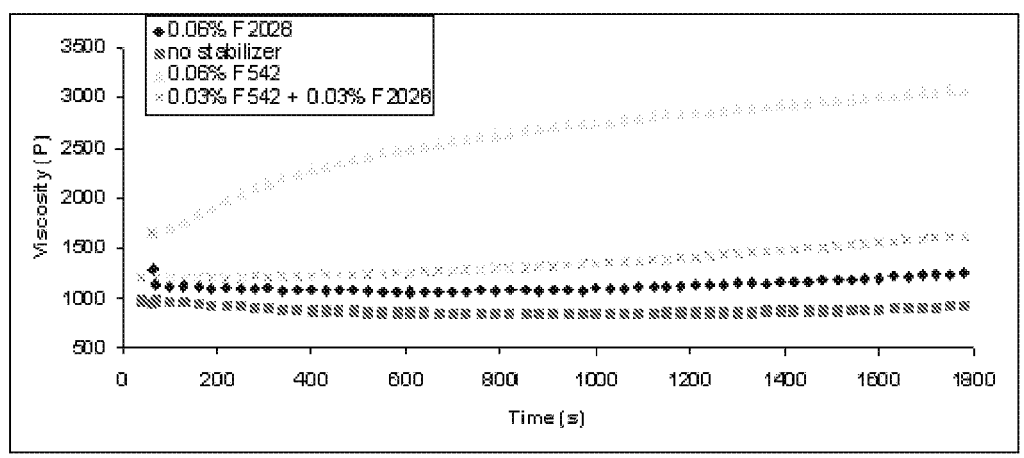

COLOR AND HEAT STABLE POLYCARBONATE COMPOSITIONS AND METHODS OF MAKING

FIELD OF THE INVENTION

The present invention relates to the development and use of heat stable polycarbonate-based resins having low discoloration and viscosity build-up during processing and aging.

BACKGROUND

Polycarbonates are synthetic thermoplastic resins that may be derived from bisphenols and phosgene, or their derivatives. The desired properties of polycarbonates include clarity or transparency, high impact strength and toughness, heat resistance, weather and ozone resistance, and good ductility. They are useful for forming a wide variety of products, such as by molding, extrusion, and thermoforming processes. Branched polycarbonates, in some cases, can produce enhanced, or more desirable, characteristics over conventional linear polycarbonates. To form a branched polycarbonate, a branching agent, which has at least three functional groups, is added to the reaction of the dihydroxy compound and phosgene.

Many thermoplastic polymers require stabilization against discoloration from exposure to elevated temperatures. Exposure to high temperatures often arise during molding and extrusion processes. Fighting discoloration with heat stabilizers can create a dramatic increase in melt viscosity during heat aging. This can be detrimental to abusive processing and affect the end performance of the material. A specific issue may arise from the use of branching agents to produce branched polycarbonates is the resultant high residual content of ionic groups, such as chlorides. High chloride content can adversely impact melt stability and the color and/or transparency of articles molded from the polycarbonate.

Accordingly, there is a need for producing branched polycarbonate resins without sacrificing melt stability and the color or transparency of the resin or molded articles during a production process.

SUMMARY OF THE INVENTION

The present invention is directed to polycarbonate resin compositions that contain two or more different heat stabilizers, a branched polycarbonate, a cyclic siloxane, and a flame retardant salt. The branched polycarbonate may be capped at its ends with a carbonate end-capping group having a pKa of between 7.5 and 10. The heat stabilizers may be selected from one or more of the following:

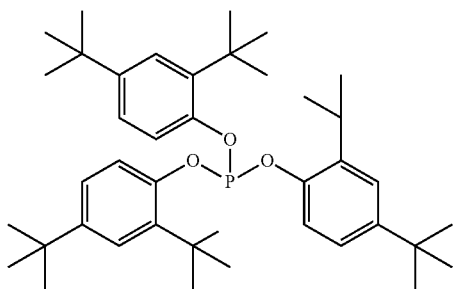 [SMILES: CC(C)c1cc(C(C)(C)C)ccc1OP(Oc1ccc(C(C)(C)C)cc1C(C)(C)C)Oc1ccc(C(C)(C)C)cc1C(C)(C)C]

tris(2,4-di-t-butylphenyl)phosphite, and

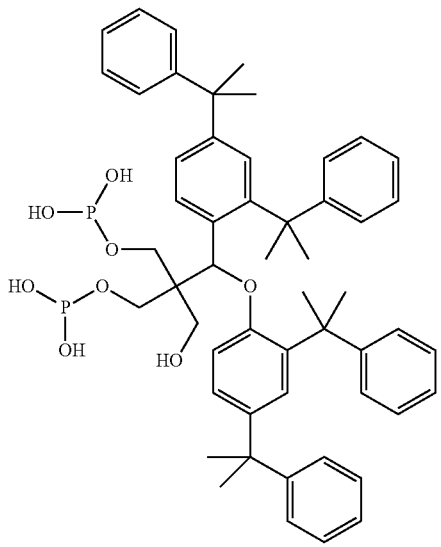 [SMILES: CC(C)(c1ccccc1)c1ccc(OC(c2ccc(C(C)(C)c3ccccc3)cc2C(C)(C)c2ccccc2)C(CO)(COP(O)O)COP(O)O)c(C(C)(C)c2ccccc2)c1]

bis(2,4-dicumylphenyl)pentaerythritol diphosphite.

The cyclic siloxane may have the structure:

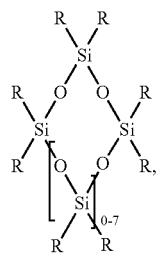

wherein R is one or more of the following: C1 to C36 alkyl, fluorinated or perfluorinated C1 to C36 alkyl, C1 to C36 alkoxy, C6 to C14 aryl, aryloxy of 6 to 14 carbon atoms, arylalkoxy of 7 to 36 carbon atoms, a phenyl, or C1 to C36 alkyl-substituted aryl of 6 to 14 carbon atoms.

The cyclic siloxane may be selected from one or more of the following: octaphenylcyclotetrasiloxane, hexamethylcyclotrisiloxane, octamethylcyclotetrasiloxane, decamethylcyclopentasiloxane, dodecmethylcyclohexasiloxane, trimethyltriphenylcyclotrisiloxane, and tetramethyltetraphenylcyclotetrasiloxane.

The branched polycarbonate of the resin may have repeating structural units of the formula

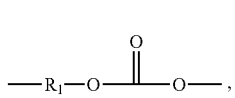

wherein at least 60% of the total number of R1 groups contain aromatic organic groups and the balance thereof are aliphatic groups, aromatic groups, alicyclic groups, or a combination of these.

The end capping group may be a carbonate end-capping group, which may be derived from a reaction with a cyanophenol of the formula:

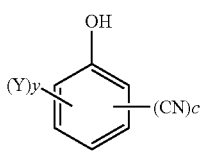

wherein Y is a halogen, C1-3 alkyl group, C1-3 alkoxy group, C7-12 arylalkyl, alkylaryl, or nitro group, y is 0 to 4, and c is 1 to 5, provided that y+c is 1 to 5.

The endcap may have at least one electron-withdrawing group. The electron-withdrawing group may be one or more of a halogen, such as fluoro, chloro, or a bromo; a perfluoroalkyl, such as —$CF_3$, or perfluoroalkoxy, such as —$OCF_3$, where the perfluoroalkyl portion of the either the perfluoroalkyl or the perfluoroalkoxy may comprise trifluoromethyl, the formula $C_nF_{2n+1}$, wherein n is an integer from 1 to 10, a cyano group, —OC(=O)$R_0$, —$SO_2CH_3$, or —C(=O)—X, where X may be hydrogen, $C_1$-$C_6$ alkyl, —$OR_1$, or —$NR_2R_3$, wherein each of $R_0$, $R_1$, $R_2$, and $R_3$ may each independently be hydrogen, $C_1$-$C_6$ alkyl, $C_5$-$C_7$ cycloalkyl, phenyl, mono-substituted phenyl, di-substituted phenyl, alkylene glycol, or polyalkylene glycol, wherein the phenyl substituents may be $C_1$-$C_6$ alkyl or $C_1$-$C_6$ alkoxy. —OC(=O)R0 may be OC(=O)$CH_3$. $SO_2X$ may be —$SO_2CH_3$.

The branched polycarbonate may be derived from reacting a polycarbonate with a branching agent. The branching agent may be derived from a triacid trichloride of the formula:

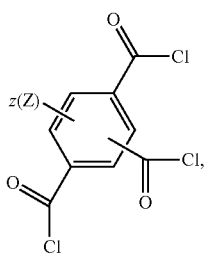

wherein Z is hydrogen, a halogen, C1-3 alkyl group, C1-3 alkoxy group, C7-12 arylalkyl, alkylaryl, or nitro group, and z is 0 to 3.

The branching agent may have a structure derived from a tri-substituted phenol of the formula

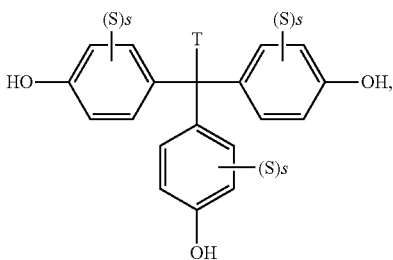

wherein T is a C1-20 alkyl group, C1-20 alkyleneoxy group, C7-12 arylalkyl, or alkylaryl group, S is hydrogen, a halogen, C1-3 alkyl group, C1-3 alkoxy group, C7-12 arylalkyl, alkylaryl, or nitro group, s is 0 to 4.

The branching agent may have a structure of the formula:

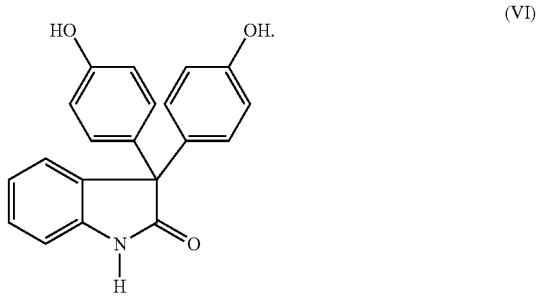 [SMILES: O=C1Nc2ccccc2C1(c1ccc(O)cc1)c1ccc(O)cc1]

The branching agent may be a combination of two or more branching agents. The branching agent may the branching agent groups are present in an amount of 0.75 to 5 branching units per 100 R1 units.

The branching agent may be at least one of the following: tremellitic trichloride (TMTC), tris-(hydroxyphenyl)ethane (THPE), isatin-bis-phenol or a combination thereof.

The flame retardant salt may be at least one of the following: alkali metal salt of perfluorinated C1-C16 alkyl sulfonates; potassium perfluorobutane sulfonate; potassium perfluoroctane sulfonate; tetraethylammonium perfluorohexane sulfonate; sodium toluene sulfonate, sodium diphenylsulfone sulfonate and potassium diphenylsulfone sulfonate. The flame retardant salt may be potassium perfluorobutane.

The resin composition may further comprise bis(diphenyl) phosphate of bis-phenol-A (BPADP). The resin may have a viscosity build of less than 20% at 300° C. Melt viscosity may be measured using a rheometric method. For example, melt viscosity values for a resin may be obtained on a rheometer. The percent viscosity change after a certain length of time may be determined from a graph of the melt viscosity change as a function of time during a rheometric test. For example, the percentage viscosity change (% Viscosity) may be determined by applying the following equation:

$$\% \text{ Viscosity}=(V_{30\ minutes}-V_{initial})/V_{initial}\times 100$$

wherein $V_{30 minutes}$ is the melt viscosity measured at 300° C. after 30 minutes, $V_{intial}$ is the initial melt viscosity at 300° C. reported by the rheometer. 30 minutes is only an example of the length of time over which the percent viscosity change may be measured.

The resin may have a viscosity of at least 500 Poise at 300° C.

The resin composition may further comprise a hindered phenol heat stabilizer. The hindered phenol heat stabilizer is octadecyl-3(3,5-ditertbutyl-4-hydroxyphenyl)propionate.

The resin composition may further comprise a linear siloxane having the formula:

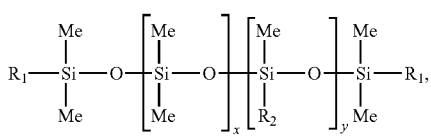

wherein R1 is a C1 to C18 alkyl group, R2 is a phenyl, and x and y sum to 1. The resin composition may comprise a polycarbonate siloxane copolymer. The resin composition may comprise octadecyl-3(3,5-ditertbutyl-4-hydroxyphenyl)propionate.

The present invention is also directed to an article derived from the polycarbonate resin composition. The article may be about 3.2 mm thick and have a yellowing index (Yi) of less than 3. The article may have a Yi of less than 2.5. The article may be manufactured by a method comprising extruding the polycarbonate resin composition and molding the extruded composition into an article.

The present invention is also directed to a method of manufacturing an article. The method may comprise extruding the composition and molding the extruded composition into an article.

The herein described polycarbonate resin composition may comprise between between 20 and 50 weight % of a branched polycarbonate; between 50 and 80 weight % of a mixture of high flow polycarbonate; low flow polycarbonate; and THPE branched polycarbonate; between 0.016 and 0.06 weight % bis(2,4-dicumylphenyl)pentaerythritol diphosphite; between 0.005 and 0.028 weight % of tris(2,4-di-t-butylphenyl)phosphite; between 0.015 and 0.05 weight % of a hindered phenol; between 0.1 and 0.4 weight % of a release agent; between 0.1 and 0.4 weight % of a UV additive; between 0.05 and 0.1 weight % of a flame retardant salt; and between 0.0 and 0.4 weight % of a linear siloxane additive. The polycarbonate resin composition may further comprise a colorant.

Also described herein is a composition consisting of

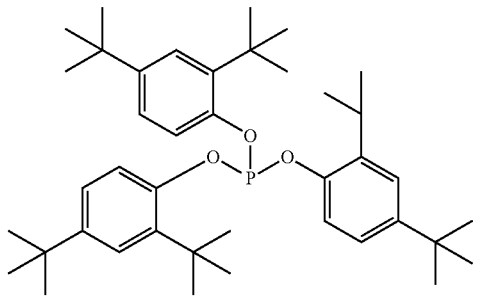 [SMILES: CC(C)c1cc(C(C)(C)C)ccc1OP(Oc1ccc(C(C)(C)C)cc1C(C)(C)C)Oc1ccc(C(C)(C)C)cc1C(C)(C)C]

tris(2,4-di-t-butylphenyl)phosphite;

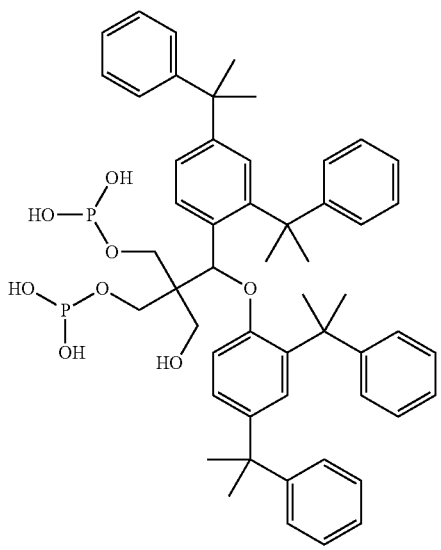 [SMILES: CC(C)(c1ccccc1)c1ccc(OC(c2ccc(C(C)(C)c3ccccc3)cc2C(C)(C)c2ccccc2)C(CO)(COP(O)O)COP(O)O)c(C(C)(C)c2ccccc2)c1]

bis(2,4-dicumylphenyl)pentaerythritol diphosphite, a branched polycarbonate, wherein the branching agent groups are present in an amount of 0.75 to 5 branching units per 100 R1 units, a cyclic siloxane, wherein the branched polycarbonate contains a carbonate end-capping group having a pKa value of between 7.5 and 10. The carbonate end-capping group has a pKa value of between 8 and 9. The carbonate end-capping group is a cyanophenol.

Also described herein is a polycarbonate resin comprising between 0.005 and 0.028 weight % of a first heat stabilizer; between 0.016 and 0.06 weight of a second heat stabilizer; between 20 and 50 weight % of a branched polycarbonate, between 0.05 and 0.1 weight % of a cyclic siloxane; and between 0.05 and 0.1 weight % of a flame retardant salt.

The first heat stabilizer may be

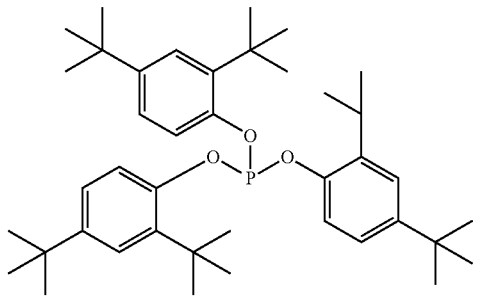 [SMILES: CC(C)c1cc(C(C)(C)C)ccc1OP(Oc1ccc(C(C)(C)C)cc1C(C)(C)C)Oc1ccc(C(C)(C)C)cc1C(C)(C)C]

tris(2,4-di-t-butylphenyl)phosphite and the second heat stabilizer may be

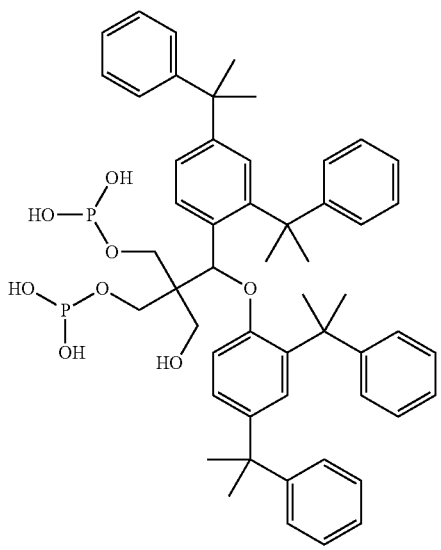 [SMILES: CC(C)(c1ccccc1)c1ccc(OC(c2ccc(C(C)(C)c3ccccc3)cc2C(C)(C)c2ccccc2)C(CO)(COP(O)O)COP(O)O)c(C(C)(C)c2ccccc2)c1]

bis(2,4-dicumylphenyl)pentaerythritol diphosphite. The cyclic siloxane may have the structure:

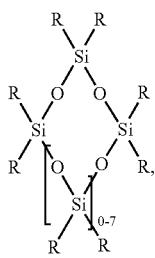

wherein R is one or more of the following: C1 to C36 alkyl, fluorinated or perfluorinated C1 to C36 alkyl, C1 to C36 alkoxy, C6 to C14 aryl, aryloxy of 6 to 14 carbon atoms, arylalkoxy of 7 to 36 carbon atoms, a phenyl, or C1 to C36 alkyl-substituted aryl of 6 to 14 carbon atoms. The at least one R may be a phenyl. The branched polycarbonate comprises repeating structural carbonate units of the formula:

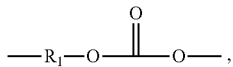

wherein at least 60% of the total number of R1 groups contain aromatic organic groups and the balance thereof are aliphatic, alicyclic, or aromatic groups. The carbonate end-capping group may be derived from reaction with a cyanophenol of the formula:

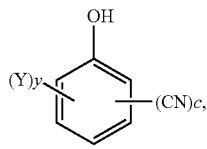

wherein Y is a halogen, C1-3 alkyl group, C1-3 alkoxy group, C7-12 arylalkyl, alkylaryl, or nitro group, y is 0 to 4, and c is 1 to 5, provided that y+c is 1 to 5. The carbonate end-capping group may have at least one electron-withdrawing group. The at least one electron-withdrawing group is one or more of a halogen, a perfluoroalkyl, and/or $C_nF_{2n+1}$, wherein n is an integer from 1 to 10, a cyano group, —OC(=O)$R_0$, —SO$_2$CH$_3$, or —C(=O)—X, where X is hydrogen, $C_1$-$C_6$ alkyl, —OR$_1$, or —NR$_2$R$_3$, wherein each of $R_0$, $R_1$, $R_2$, and $R_3$ is each independently one of a hydrogen, $C_1$-$C_6$ alkyl, $C_5$-$C_7$ cycloalkyl, phenyl, mono-substituted phenyl, di-substituted phenyl, alkylene glycol, or polyalkylene glycol, wherein the phenyl substituents are $C_1$-$C_6$ alkyl and/or $C_1$-$C_6$ alkoxy. The branching agent may have a structure derived from a triacid trichloride of the formula:

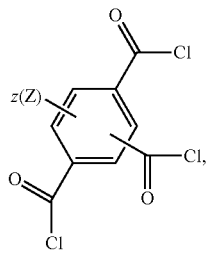

wherein Z is hydrogen, a halogen, C1-3 alkyl group, C1-3 alkoxy group, C7-12 arylalkyl, alkylaryl, or nitro group, and z is 0 to 3; or wherein the branching agent is a structure derived from a tri-substituted phenol of the formula

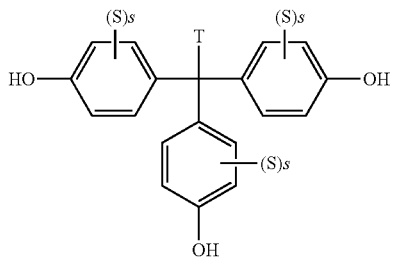

wherein T is a C1-20 alkyl group, C1-20 alkyleneoxy group, C7-12 arylalkyl, or alkylaryl group, S is hydrogen, a halogen, C1-3 alkyl group, C1-3 alkoxy group, C7-12 arylalkyl, alkylaryl, or nitro group, s is 0 to 4; or wherein the branching agent comprises a structure of the formula:

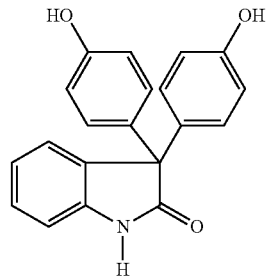 [SMILES: O=C1Nc2ccccc2C1(c1ccc(O)cc1)c1ccc(O)cc1]

or a combination comprising one or more of the branching agents.

The branching agent groups may be present in an amount of 0.75 to 5 branching units per 100 $R^1$ units. The branching agent may be at least one of the following: tremellitic trichloride (TMTC), tris-(hydroxyphenyl)ethane (THPE), and/or isatin-bis-phenol. The flame retardant salt is at least one of the following: alkali metal salt of perfluorinated C1-C16 alkyl sulfonates; potassium perfluorobutane sulfonate; potassium perfluoroctane sulfonate; tetraethylammonium perfluorohexane sulfonate; sodium toluene sulfonate, sodium diphenylsulfone sulfonate and potassium diphenylsulfone sulfonate. The flame retardant salt is potassium perfluorobutane sulfonate.

The resin may further comprise bis(diphenyl)phosphate of bisphenol-A (BPADP). The cyclic siloxane may be at least one of the following: octaphenylcyclotetrasiloxane, hexamethylcyclotrisiloxane, octamethylcyclotetrasiloxane, decamethylcyclopentasiloxane, dodecmethylcyclohexasiloxane, trimethyltriphenylcyclotrisiloxane, and tetramethyltetraphenylcyclotetrasiloxane. The cyclic siloxane may be octaphenylcyclotetrasiloxane. The resin has a viscosity build of less than 20% at 300° C. The resin has a viscosity of at least 500 Poise at 300° C. The resin may further comprise a third heat stabilizer.

The linear siloxane may have the formula:

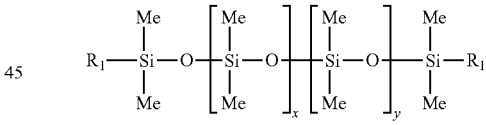

wherein R2 is a C1 to C18 alkyl group, $R^2$ is a phenyl, and x and y sum to 1.

The composition may further comprise a polycarbonate siloxane copolymer.

The composition may further comprise a third heat stabilizer, which may be octadecyl-3 (3,5-ditertbutyl-4-hydroxyphenyl)propionate.

Also described herein is an article formed from the resin composition.

BRIEF DESCRIPTION OF THE DRAWINGS

FIG. 1 shows the influence of phosphite heat stabilizer on polycarbonate melt viscosity and the progression of viscosity at 300° C.

DETAILED DESCRIPTION

Use of the herein described combinations of branched polycarbonate polymers, heat stabilizers and a carbonate endcap group(s) allows for the production of branched polycarbonate resins capable for use in a variety of applications where, for example, low color and low melt are needed. The inventor has discovered that certain combinations of particular hydrogen phosphites are excellent in stabilizing branched polycarbonate resins against discoloration and increased melt viscosity due to exposure of the resin to elevated temperatures.

1. Definitions

The terminology used herein is for the purpose of describing particular embodiments only and is not intended to be limiting. As used in the specification and the appended claims, the singular forms "a," "and" and "the" include plural references unless the context clearly dictates otherwise.

"Alkyl" as used herein may mean a linear, branched, or cyclic group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like.

"Halo" as used herein may be a substituent to which the prefix is attached is substituted with one or more independently selected halogen radicals. For example, "$C_1$-$C_6$ haloalkyl" means a $C_1$-$C_6$ alkyl substituent wherein one or more hydrogen atoms are replaced with independently selected halogen radicals. Non-limiting examples of $C_1$-$C_6$ haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

"Halogen" or "halogen atom" as used herein may mean a fluorine, chlorine, bromine or iodine atom.

"HBN 3% THPE branched resin" as used herein may mean a BPA-polycarbonate resin that comprises p-hydroxybenzonitrile as the end-capping agent and THPE (tris-(hydroxyphenyl)ethane) as the branching agent and has an average molecular weight of 30,000 g/mol. The HBN 3% THPE branched resin may be obtained by interfacial polymerization.

"Copolymer" as used herein may mean a polymer derived from two or more structural unit or monomeric species, as opposed to a homopolymer, which is derived from only one structural unit or monomer.

"C3-C6 cycloalkyl" as used herein may mean cyclopropyl, cyclobutyl, cyclopentyl and cyclohexyl.

"Halogen" or "halogen atom" as used herein may mean a fluorine, chlorine, bromine or iodine atom.

"Heteroaryl" as used herein may mean any aromatic heterocyclic ring which may comprise an optionally benzocondensed 5 or 6 membered heterocycle with from 1 to 3 heteroatoms selected among N, O or S, Non limiting examples of heteroaryl groups may include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazotyl, pyrazolyl, thienyl, benzothienyl, isoindolinyl, benzoimidazolyl, quinolinyl, isoquinolinyl, 1,2,3-triazolyl, 1-phenyl-1,2,3-triazolyl, and the like.

"Polycarbonate" as used herein may mean an oligomer or polymer comprising residues of one or more polymer structural units, or monomers, joined by carbonate linkages.

"Straight or branched C1-C3 alkyl" or "straight or branched C1-C3 alkoxy" as used herein may mean methyl, ethyl, n-propyl, isopropyl, methoxy, ethoxy, n-propoxy and isopropoxy.

"$pK_a$" as used herein may mean the $-\log_{10}$ of $K_a$, where $K_a$ is a value used to describe the tendency of compounds or ions to dissociate. The $K_a$ value may be referred to as "the dissociation constant," "the ionization constant," or "the acid constant."

"Polycarbonate" as used herein may mean an oligomer or polymer comprising residues of one or more polymer structural units, or monomers, joined by carbonate linkages.

Unless otherwise indicated, each of the foregoing groups may be unsubstituted or substituted, provided that the substitution does not significantly adversely affect synthesis, stability, or use of the compound.

The terms "structural unit" and "monomer" are interchangeable as used herein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. Polycarbonate Resin Components

The herein described polycarbonate resin composition comprises two or more heat stabilizer compounds, a cyclic siloxane, a flame retardant, and a branched polycarbonate resin. The branched polycarbonate resin may have one or more carbonate end-capping groups with a pKa value of between 7.5 and 10. One or more structural units may be subjected to melt polymerization or interfacial polymerization by adding a catalyst and allowing the mixture of catalyst and structural units to react under melt or interfacial conditions. The structural units may be polymerized with one or more other types of structural units.

a. Branched Polycarbonate

Described herein is a branched polycarbonate having structural units. The structural units may be repeating structural carbonate units of the formula (I):

wherein the R1 groups are derived from a dihydroxy compound that can be aliphatic, aromatic, alicyclic, or a combination of these. Of the total number of R1 groups present in the polycarbonate, at least 30 percent, 40 percent, 50 percent, 60 percent or 70 percent may contain aromatic organic groups and the balance thereof may be aliphatic, alicylcic, or aromatic.

The branched polycarbonate may further comprise repeating ester structural units of the formula (II):

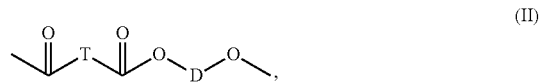

wherein D is a divalent group derived from a dihydroxy compound and T is a divalent group derived from a dicarboxylic acid.

The branched polycarbonate may be a branched BPA polycarbonate resin. The branched BPA polycarbonate resin may be made by an interfacial process. The branched BPA polycarbonate resin may have a weight average molecular weight of between about 25,000 and 45,000. The BPA polycarbonate resin may have a weight average molecular weight of 37,700. The BPA polycarbonate resin may have a weight average molecular weight of 28,700. The weight average molecular weight may be determined by gel permeation chromatography (GPC) using polycarbonate standards. The branched polycarbonate may have a melt volume flow rate (MVR) of between about 1 and 8. The branched polycarbonate may have a MVR of between about 1 and 4.

(1) Branching Agent

The branched polycarbonate may be a product of polymerizing one or more structural units in the presence of one or more branching agents, whereby the one or more branching agents are incorporated into the growing polycarbonate polymer. The branching agent may be a polyfunctional organic compound containing at least three functional groups selected from a hydroxyl, carboxy, carboxylic anhydride, haloformyl, or mixtures of these groups. Specific examples include trimellitic acid, trimellitic anhydride, trimellitic trichloride (TMTC), tris-p-hydroxy phenyl ethane (THPE), 3,3-bis-4-hydroxyphenyl)-oxindole (also known as isatin-bis-phenol), tris-phenol TC (1,3,5-tris((p-hydroxyphenyl) isopropyl)benzene), tris-phenol PA (4(4(1,1-bis (p-hydroxyphenyl)-ethyl) alpha, alpha-dimethyl benzyl) phenol), 4-chloroformyl phthalic anhydride,k trimesic acid, and benzophenone tetracarboxylic acid. The branching agent may have a structure derived from a triacid trichloride of the formula (IV):

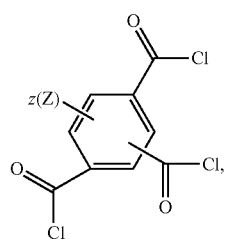

wherein Z is hydrogen, a halogen, C1-3 alkyl group, C1-3 alkoxy group, C7-12 arylalkyl, alkylaryl, or nitro group, and z is 0 to 3.

The branching agent may have a structure derived from a tri-substituted phenol of the formula

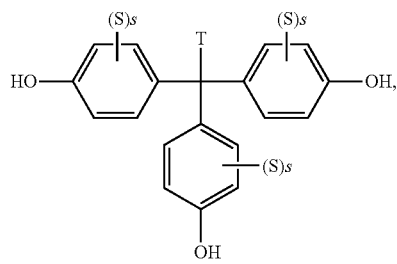

wherein T is a C1-20 alkyl group, C1-20 alkyleneoxy group, C7-12 arylalkyl, or alkylaryl group, S is hydrogen, a halogen, C1-3 alkyl group, C1-3 alkoxy group, C7-12 arylalkyl, alkylaryl, or nitro group, s is 0 to 4.

The branching agent may have a structure of the formula:

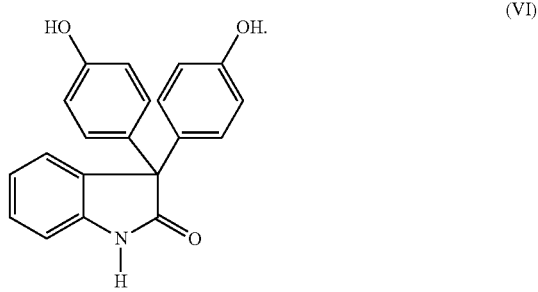 [SMILES: O=C1Nc2ccccc2C1(c1ccc(O)cc1)c1ccc(O)cc1]

The branching agent may be a combination of one or more branching agents.

The branching agent may be added to a polymerization reaction mixture comprising the structural unit. The relative amount of branching agents used in the manufacture of the polymer will depend on a number of considerations, for example, the type of R1 groups, the amount of cyanophenol, and the desired molecular weight of the polycarbonate. In generally, the amount of branching agent is effective to provide about 0.1 to 10, about 0.5 to 8, or about 0.75 to 5 branching units per 100 R1 units.

The branching agent may be added in an amount that is sufficient to achieve the desired branching content, that is, more than two end groups. This amount may be added in an amount that is relative to one or more structural units. The branching agent may be added at a level of between 0.05 and 2.0 wt %, between 0.1 and 1.5 wt %, between 0.5 and 1.0 wt %, or between 0.65 and 0.9 wt %.

(2) Carbonate End Cap

The branched polycarbonate may comprise a carbonate end cap. The carbonate end cap may have a pKa value of between 7 and 10, or between 7.5 and 10, or between 7.5 and 8.5, or between 7.5 and 9, or between 7.5 and 9.5, or between 7.75 and 8.25. The carbonate end cap may have a pKa of between 7.5 and 8.5. The carbonate end cap may be a cyanophenyl endcapping group derived from a reaction with a cyanophenol of the formula:

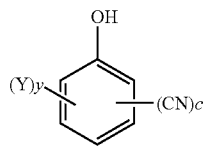

wherein Y is a halogen, C1-3, C1-3 alkoxy group, C7-12 arylalkyl, alkylaryl, or nitro group, y is 0 to 4, and c is 1 to 5, provided that y+c is 1 to 5. The cyanophenol may be p-cyanophenol or 3,4-dicyanophenol.

The endcap may have at least one electron-withdrawing group. The electron-withdrawing group may be a halogen, such as fluoro, chloro, or a bromo; a perfluoroalkyl, such as —$CF_3$, or perfluoroalkoxy, such as —$OCF_3$, where the perfluoroalkyl portion of the either the perfluoroalkyl or the perfluoroalkoxy may comprise trifluoromethyl, the formula $C_nF_{2n+1}$, wherein n is an integer from 1 to 10, a cyano group, —OC(=O)$R_0$, —$SO_2CH_3$, or —C(=O)—X, where X may be hydrogen, $C_1$-$C_6$ alkyl, —$OR_1$, or —$NR_2R_3$, wherein each of $R_0$, $R_1$, $R_2$, and $R_3$ may each independently be hydrogen, $C_1$-$C_6$ alkyl, $C_5$-$C_7$ cycloalkyl, phenyl, mono-substituted phenyl, di-substituted phenyl, alkylene glycol, or polyalkylene glycol, wherein the phenyl substituents may be $C_1$-$C_6$ alkyl or $C_1$-$C_6$ alkoxy. —OC(=O)R0 may be OC(=O)CH$_3$. SO$_2$X may be —SO$_2$CH$_3$.

A cyanophenyl endcapped polycarbonate may be prepared by reacting a dihydroxy aromatic compound of the formula HO—R1-OH, wherein at least 30 percent, 40 percent, 50 percent, 60 percent or 70 percent of the total number of R1 groups contain aromatic organic groups and the balance thereof may be aliphatic, alicylcic, or aromatic, with an activated carbonyl compound in the presence of a cyanophenol. The reaction may reside in an aqueous biphasic medium at a pH of 8 to 11. The cyanophenol, upon addition to the reaction, may not contain acid or amide groups that are detectable by Fourier transform infrared (FT-IR) analysis of the cyanophenol.

Other endcapping agents can also be used with phenol containing a cyano substitutent, provided that such agents do not significantly adversely affect the desired properties of the compositions, such as transparency, ductility, etc. Other endcapping agents include certain other mono-phenolic compounds, mono-carboxylic acid chlorides, and/or mono-chloroformates. Mono-phenolic end capping agents include monocyclic phenols such as phenol and C1-C22 alkyl-substituted phenols such as P-cumyl-phenol, resorcinol monobenzoate, and p- and tertiary-butyl phenol; and mono-ethers of diphenols, such as P-methoxyphenol. Alkyl-substituted phenols with branched chain alkyl substituents having 8 to 9 carbon atoms may be used. Certain mono-phenolic UV absorbers may also be used as a capping agent. Examples include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-92-hydroxyaryl)-1,3,5-triazines and their derivatives, and the like.

Mono-carboxylic acid chlorides may also be used with cyanophenols as end-capping agents. These include monocyclic, mono-carboxylic acid chlorides such as benzoyl chloride, C1-C22 alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic and mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms may be useful. Mono-chloroformates including monocyclic, mono-chloroformates, such as phenyl chloroformate, alkyl-substituted phenyl chloroformate, p-cumyl phenyl chloroformate, toluene chloroformate, and combinations thereof.

The cyanophenols may be added to the polymerization reaction as an endcapping agent using conventional processes. The relative amount of cyanophenol used in the manufacture of the polymer will depend on a number of considerations, for example the type of R1 groups, the amount of branching agent, and the desired molecular weight of the branched polycarbonate. In general, the amount of cyanophenol may be effective to provide 1 to 20 cyanophenyl carbonate units per 100 R1 units, 2 to 15 cyanophenyl carbonate units per 100 R1 units, or 3 to 12 cyanophenyl carbonate units per 100 R1 units. Up to about half of the cyanophenyl carbonate units may be replaced by a different type of endcapping unit.

The cyanophenol branched polycarbonates may have a weight average molecular weight of about 5,000 to about 200,000, of about 10,000 to about 100,000 or about 15,000 to about 80,000, or about 16,000 to about 60,000 grams per mole (g/mol). The weight average molecular weight may be measured by gel permeation chromatography (GPC). The GPC column may be a crosslinked styrene-divinylbenzene column, which then may be calibrated to polycarbonate references. GPC samples may be prepared at concentration of about 1 mg/ml, and may be eluted at a flow rate of about 1.5 ml/min.

b. Heat Stabilizer

The polycarbonate resin composition may contain one or more heat stabilizers. The one or more heat stabilizers may be selected from:

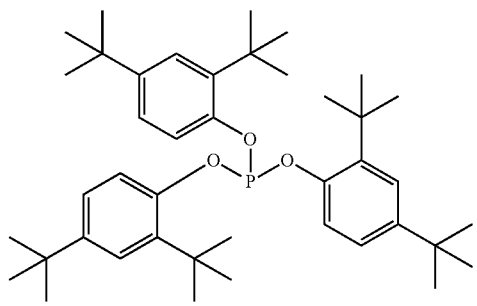 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

tiris (2,4-di-t-butylphenyl)phosphite
(also known as IRGAPHOS® 168),

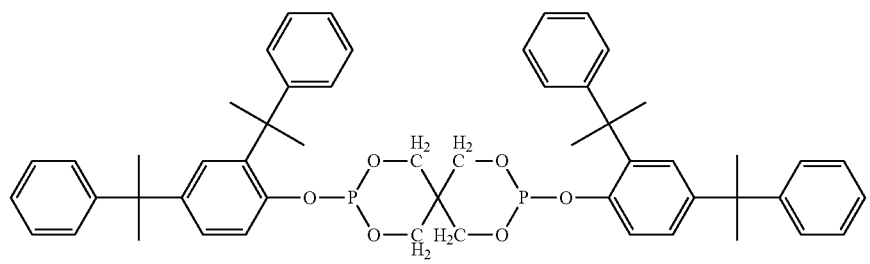 [SMILES: CC(C)(c1ccccc1)c1ccc(OP2OCC3(CO2)COP(Oc2ccc(C(C)(C)c4ccccc4)cc2C(C)(C)c2ccccc2)OC3)c(C(C)(C)c2ccccc2)c1]

bis(2,4-dicumylphenyl)pentaerythritol diphosphite (also known as DOVERPHOS® S-9228), and a hindered phenol heat stabilizer such as:

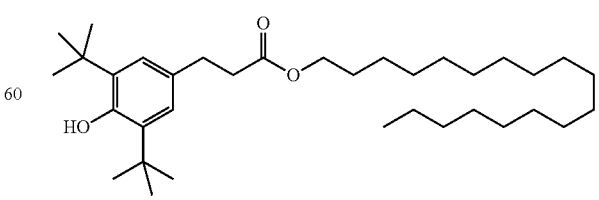

octadecyl-3(3,5-ditertbutyl-4-hydroxyphenybpropionate
(also known as IRGANOX® 1076.

The one or more heat stabilizers may be used in amounts of 0.00001 to 1 part by weight, based on 100 parts by weight of the polymer component of the thermoplastic composition. The polycarbonate resin composition may contain between 0.001 weight (wt) % and 0.003 wt %, between 0.003 wt % and 0.006 wt %, between 0.01 wt % and 0.03 wt %, between 0.02 wt % and 0.03 wt %, between 0.025 wt % and 0.03 wt %, between 0.02 wt % and 0.04 wt %, between 0.04 wt % and 0.06 wt %, between 0.06 wt % and 0.08 wt %, between 0.08 wt % and 0.1 wt %, between 0.1 wt % and 0.3 wt %, between 0.3 wt % and 0.5 wt %, between 0.5 wt % and 0.7 wt %, between 0.7 wt % and 0.9 wt %, between 0.9 wt % and 1.1 wt %, between 1.1 wt % and 1.3 wt %, between 1.3 wt % and 1.5 wt %, or between 1.5 wt % and 2.0 wt % of each heat stabilizer. Any combination of heat stabilizer may be incorporated into the resin. Two or more heat stabilizers incorporated into the resin may have different wt percents. The weight ratio of one heat stabilizer to another heat stabilizer in the resin composition may be 5:95, 10:90, 20:80, 30:70, 40:60, or 50:50. The weight ratio of three heat stabilizers in the resin may be 5:10:85, 33.3:33.3:33.3, 10:20:70, 20:20:60, 30:30:40, 40:40:20, or 10:10:80.

The one or more heat stabilizers may be added to the polymerization reaction and/or to the branched polycarbonate prior to extrusion. The polymerization reaction may include one or more structural units in the presence of one or more branching agents.

c. Flame Retardant

The polycarbonate resin may further comprise a one or more flame retardants. The one or more flame retardants may be flame retardant salts. The one or more flame retardant salts may include, for example, flame retardant salts, such as alkali metal salts of perluorinated C1-16 alkyl sulfonates such as potassium perfluorobutane sulfonate (Rimar salt), potassium potassium perfluoroctane sulfonate, tetraethylammonium perfluorohexane sulfonate, potassium diphenylsulfone sulfonate (KSS), sodium toluenesulfonate (NaTS), sodium diphenylsulfone sulfonate (NaSS), and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoroanion complex such as $Li_3AlF_6$, $BaSiF_6$, $KBF_4$, $K_3AlF_6$, $KAlF_4$, $K_2SiF_6$, and/or $Na_3AlF_6$ or the like. Alkali metal salts of perfluorinated C1-C16 alkyl sulfonates, KSS and NaTS, alone or in combination with other flame retardants, are particularly useful in the polycarbonate compositions disclosed herein.

In another embodiment, the flame-retardants are selected from at least one of the following: alkali metal salts of perfluorinated C1-16 alkyl sulfonates; potassium perfluorobutane sulfonate (Rimar Salt); potassium perfluoroctane sulfonate; tetraethylammonium perfluorohexane sulfonate; and potassium diphenylsulfone sulfonate.

In another embodiment, other flame retardants such as organic compounds that include phosphorus, bromine, and/or chlorine can also be present in combination with the flame retardant salts. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl) p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or poly-functional aromatic phosphorus-containing compounds are also useful, for example, compounds of the formulas below:

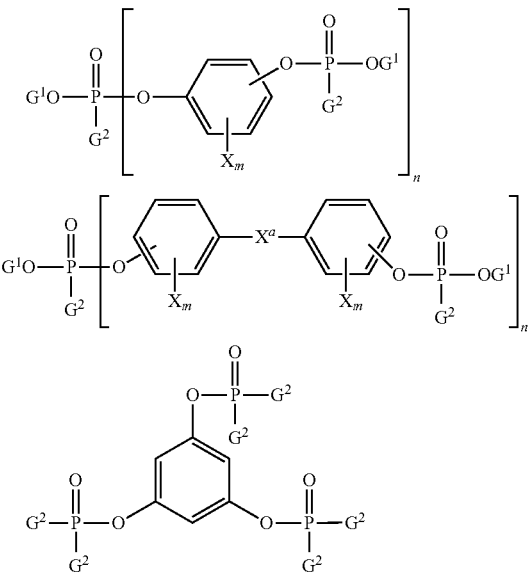

wherein each G1 is independently a hydrocarbon having 1 to 30 carbon atoms; each G2 is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively (BPADP), their oligomeric and polymeric counterparts, and the like.

Exemplary flame retardant additives containing phosphorus-nitrogen bonds include phosphonitrilic chloride, phosphorus ester amides, phosphoric acid amides, phosphonic acid amides, phosphinic acid amides, tris(aziridinyl)phosphine oxide.

Halogenated organic flame retardant compounds can also be used as flame retardants, for example halogenated flame retardant compounds of the following formula:

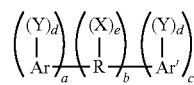

wherein R is a C1-36 alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur-containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (20) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Another useful class of flame retardant is the class of cyclic siloxanes having the general formula (R2SiO)y wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

When present, the foregoing flame retardant additives are generally present in amounts of 0.01 to 10 wt. %, more specifically 0.02 to 5 wt. %, and more specifically 0.01 to 1 wt % based on 100 parts by weight of the polymer component of the thermoplastic composition.

d. Siloxane

The polycarbonate resin composition may further comprise a cyclic siloxane. The cyclic siloxanes may impart fire/flame-retardant properties in the presence of perfluoroalkane sulfonates as described in U.S. Pat. No. 6,353,046, which is fully incorporated herein by reference. Cyclic siloxanes may improve the melt viscosity of the polycarbonate resin.

The cyclic siloxane may include those with the general formula as provided

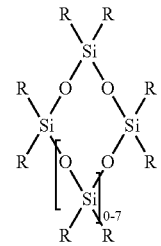

wherein R may be any one of the following: C1 to C36 alkyl, fluorinated or perfluorinated C1 to C36 alkyl, C1 to C36 alkoxy, C6 to C14 aryl, aryloxy of 6 to 14 carbon atoms, arylalkoxy of 7 to 36 carbon atoms, or C1 to C36 alkyl-substituted aryl of 6 to 14 carbon atoms. In the cyclic siloxane formula provided above, at least one R may be a phenyl. Examples of cyclic siloxanes, but not limited to, may be any one of the following: a cyclic phenyl containing siloxane, octaphenylcyclotetrasiloxane, hexamethylcyclotrisiloxane, octamethylcyclotetrasiloxane, decamethylcyclopentasiloxane, dodecamethylcyclohexasiloxane, trimethyltriphenylcyclotrisiloxane, and tetramethyltetraphenylcyclotetrasiloxane.

In addition to the cyclic siloxane, the resin composition may further comprise a linear siloxane. The linear siloxane may be a linear phenyl containing siloxane. The polycarbonate resin composition may contain about 0.1% or greater of a siloxane phenyl containing additive. The siloxane phenyl additive may be a poly(phenylmethylsiloxane). The poly(phenylmethylsiloxane) may have the following structure:

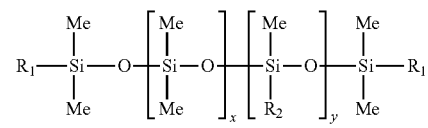

wherein R1 is a C1-C18 alkyl group, R2 is a phenyl, and x and y may vary in ratio but sum to 1. R1 may be a methyl.

The polycarobonate resin composition may contain at least two types of siloxanes. The composition may have between about 0.1% and about 0.8% polymethylsiloxanes and about 0.1% to about 0.8% octaphenyl cyclotetrasiloxane. The composition may have between about 0.1% or greater of octaphenyl cyclotetrasiloxane.

The Cyclic and/or linear siloxane may be included in the polycarbonate resin at a level sufficient to impart lowering the melt viscosity of the polycarbonate resin and/or imparting flame-retardant properties. This level may be in amount of from 0.02 to 0.3 proportional by total weight of the composition (phr). It may be 0.02, 0.04, 0.06, 0.08, 0.10, 0.12, 0.14. 0.16, 0.18, 0.20, 0.22, 0.24, 0.26, 0.28, 0.30, 0.32, 0.34, or 0.36 phr.

The cyclic and/or linear siloxane may be blended with the molten polycarbonate as described above. The blend may be in a screw-type extruder, and extruded and molded into parts of desired shapes. Cyclic and/or linear siloxane may be added to the polycarbonate resin in combination with a flame-retardant additive composition comprising perfluoroalkane sulfonate. The flame-retardant composition may comprise perfluoroalkane sulfonate and the cyclic siloxane in a ratio of from about 0.07 to about 5 by weight.

3. Other Additives a. Impact Modifiers

The resin composition may further comprise impact modifiers. For example, the composition can further include impact modifier(s), with the proviso that the additives are selected so as to not significantly adversely affect the desired properties of the composition. Suitable impact modifiers may be high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers may be used.

A specific type of impact modifier may be an elastomer-modified graft copolymer comprising (i) an elastomeric (i.e., rubbery) polymer substrate having a Tg less than about 10° C., less than about 0° C., less than about –10° C., or between about –40° C. to –80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric C1-8 alkyl(meth)acrylates; elastomeric copolymers of C1-8 alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the C1-C6 esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

MBS may be derived from the following monomers:

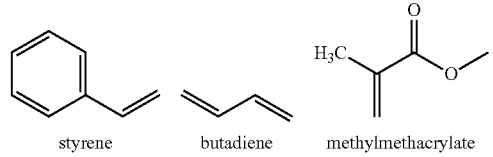

styrene    butadiene    methylmethacrylate

SEBS may be a linear triblockcopolymer based on styrene and ethylene/butylene. Each copolymer chain that may consist of three blocks: a middle block that is a random ethylene/butylene copolymer surrounded by two blocks of polystyrene. The SEBS may be styrene-b-(ethylene-co-butylene)-b-styrene polymer.

Impact modifiers may be present in amounts of 1 to 30 parts by weight, based on 100 parts by weight of copolycarbonate, polysiloxane-polycarbonate, and any additional polymer. Impact modifiers may include MBS and SBS.

b. Ultra High, High, and Low Flow Polycarbonates and THPE Branch Polycarbonates

The resin composition may further comprise an ultra high flow PC, a high flow PC, a low flow PC, a THPE branched PC, or a mixture thereof.

The ultra high flow polycarbonate may be a BPA homopolymer, which may be made by an interfacial process. The ultra high flow polycarbonate may have a weight average molecular weight of between 17000 and 18000 as determined by gel permeation chromatography (GPC) using polycarbonate standards. The ultra high flow polycarbonate may have a weight average molecular weight of 17650. The ultra high flow polycarbonate may have a melt volume flow rate (MVR) of between about 60 and 80.

The high flow PC may include, for example, bisphenol-A polycarbonate homopolymer having a molecular weight of about 21,600 to 22,200, which may be based on Gel Permeation chromatography measurements using polycarbonate standards. The high flow PC may be made by an interfacial process. The high flow PC may have a melt volume flow rate (MVR) of between about 21.9 and 31.8.

The low flow PC may include, for example, bisphenol-A polycarbonate homopolymer having a molecular weight of about 29,500 to 30,300. The low flow PC may be made by an interfacial process. The low flow PC may have a molecular weight of 30,000 as determined by GPC using polycarbonate standards. The low flow PC may be, for example, a bisphenol-A polycarbonate homopolymer having a molecular weight of 30,000 as determined by GPC using polycarbonate standards. The low flow PC may have a MVR of between about 5 and 7.

The THPE (1,1,1-tris-(p-hydroxyphenyl)ethane) branched PC may be made by an interfacial process. The THPE branched PC may have a weight average molecular weight of 37,700. The THPE branched PC may be present in the resin composition in an amount of between 0.3 wt % and 0.7 wt %.

In one embodiment, a mixture of high flow PC and low flow PC is used as the component (i). The weight ratio between the high flow PC and low flow PC may be in the range of from about 5:95 to about 95:5, specifically from about 10:90 to about 90:10, and more specifically from about 20:80 to about 80:20.

In an embodiment, the polycarbonate has flow properties suitable for the manufacture of thin articles. Melt volume flow rate (often abbreviated MVR) measures the rate of extrusion of a thermoplastic through an orifice at a prescribed temperature and load. Polycarbonates suitable for the formation of thin articles may have an MVR, measured at 300° C./1.2 kg according to ASTM D1238-04, of 0.5 to 80 cubic centimeters per 10 minutes (cc/10 min). In a specific embodiment, a suitable polycarbonate composition has an MVR measured at 300° C./1.2 kg according to ASTM D1238-04, of 0.5 to 50 cc/10 min, specifically 1 to 25 cc/10 min, and more specifically 3 to 20 cc/10 min. Mixtures of polycarbonates of different flow properties may be used to achieve the overall desired flow property.

c. Polycarbonate Siloxane Copolymer

The resin composition may further comprise one or more polycarbonate siloxane copolymers. The one or more polycarbonate siloxane copolymer may impart exceptional low temperature impact performance to articles derived from the resin composition.

The polycarbonate siloxane copolymer may comprise polydimethylsiloxane blocks, wherein the polydimethylsiloxane blocks have degrees of polymerization of from 30 to 100 dimethylsiloxane moieties. The dimethylsiloxane repeating units may have a specific block length and may be present in an article in an amount sufficient so that the article has relatively high ductility at −20° C.

The polycarbonate siloxane copolymer may be a polydimethylsiloxane-polycarbonate copolymer resin, wherein the weight % of the dimethylsiloxane repeating units is from about 3.5% to 7% based on the total weight of the polycarbonate.

Polysiloxane-polycarbonates may comprise carbonate units of formula (I) and polysiloxane blocks derived from a siloxane-containing dihydroxy compounds (also referred to herein as "hydroxyaryl end-capped polysiloxanes") that contains diorganosiloxane units blocks of formula (V):

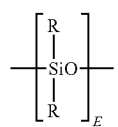

(V)

wherein each occurrence of R is same or different, and is a C1-13 monovalent organic group. For example, R can be a C1-C13 alkyl group, C1-C13 alkoxy group, C2-C13 alkenyl group, C2-C13 alkenyloxy group, C3-C6 cycloalkyl group, C3-C6 cycloalkoxy group, C6-C14 aryl group, C6-C10 aryloxy group, C7-C13 aralkyl group, C7-C13 aralkoxy group, C7-C13 alkylaryl group, or C7-C13 alkylaryloxy group. The foregoing groups can be fully or partially halogenated with fluorine, chlorine, bromine, or iodine, or a combination thereof. In an embodiment, where a transparent isosorbide-based polycarbonate is desired, R does not contain any halogen. Combinations of the foregoing R groups can be used in the same isosorbide-based polycarbonate.

The value of E in formula (V) can vary widely depending on the type and relative amount of each of the different units in the isosorbide-based polycarbonate, the desired properties of the isosorbide-based polycarbonate, and like considerations. Generally, E can have an average value of about 2 to about 1,000, specifically about 2 to about 500, more specifically about 2 to about 100. In an embodiment, E has an average value of about 4 to about 90, specifically about 5 to about 80, and more specifically about 10 to about 70. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

In one embodiment, the polysiloxane blocks are provided by repeating structural units of formula (W):

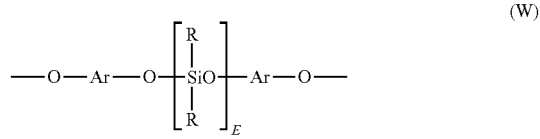

(W)

wherein E is as defined above; each R is the same or different, and is as defined above; and each Ar is the same or different, and is a substituted or unsubstituted C6-C30 arylene group, wherein the bonds are directly connected to an aromatic moiety. Ar groups in formula (W) can be derived from a C6-C30 dihydroxyaromatic compound, for example a dihydroxyaromatic compound of formula (H) or (M) described in detail below. Combinations comprising at least one of the foregoing dihydroxyaromatic compounds can also be used. Exemplary dihydroxyaromatic compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), 1,1-bis(4-hydroxy-3-methylphenyl)cyclohexane, and 1,1-bis (4-hydroxy-t-butylphenyl)propane, or a combination comprising at least one of the foregoing dihydroxy compounds.

Polycarbonates comprising such units can be derived from the corresponding dihydroxy compound of formula (X):

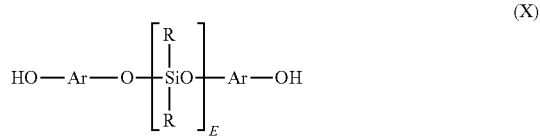

(X)

wherein Ar and E are as described above. Compounds of formula (T) can be obtained by the reaction of a dihydroxyaromatic compound with, for example, an alpha, omega-bis-acetoxy-polydiorganosiloxane oligomer under phase transfer conditions. Compounds of formula (T) can also be obtained from the condensation product of a dihydroxyaromatic compound, with, for example, an alpha, omega bis-chloro-polydimethylsiloxane oligomer in the presence of an acid scavenger.

In another embodiment, polydiorganosiloxane blocks comprises units of formula (Y):

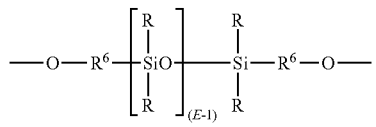

wherein R and E are as described above, and each R6 is independently a divalent C1-C30 organic group, and wherein the oligomerized polysiloxane unit is the reaction residue of its corresponding dihydroxy compound. The polysiloxane blocks corresponding to formula (Y) are derived from the corresponding dihydroxy compound of formula (Z):

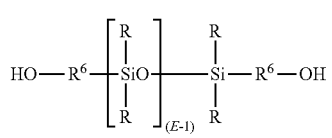

wherein R and E and R6 are as described for formula (Y).

In a specific embodiment, the polydiorganosiloxane blocks are provided by repeating structural units of formula (AA):

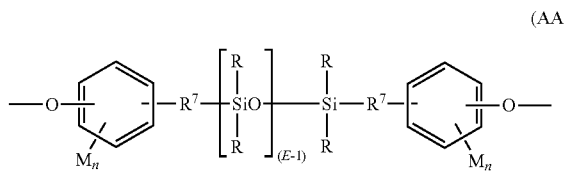

wherein R and E are as defined above. R7 in formula (AA) is a divalent C2-C8 aliphatic group. Each M in formula (AA) can be the same or different, and is a halogen, cyano, nitro, C1-C8 alkylthio, C1-C8 alkyl, C1-C8 alkoxy, C2-C8 alkenyl, C2-C8 alkenyloxy group, C3-C8 cycloalkyl, C3-C8 cycloalkoxy, C6-C10 aryl, C6-C10 aryloxy, C7-C12 aralkyl, C7-C12 aralkoxy, C7-C12 alkylaryl, or C7-C12 alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; R7 is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, R7 is a divalent C1-C3 aliphatic group, and R is methyl.

Polysiloxane-polycarbonates comprising units of formula (AA) can be derived from the corresponding dihydroxy polydiorganosiloxane (BB):

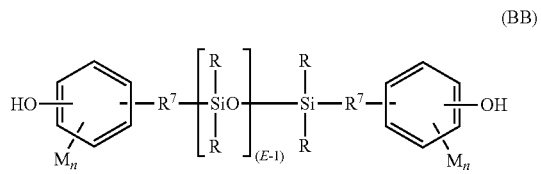

wherein each of R, E, M, R7, and n are as described above. Such dihydroxy polysiloxanes can be made by effecting a platinum-catalyzed addition between a siloxane hydride of formula (CC):

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

In an embodiment, the polysiloxane-polycarbonate can comprise polysiloxane blocks derived from the corresponding dihydroxy polysiloxane compound, present in an amount of 0.15 to 30 wt %, specifically 0.5 to 25 wt %, and more specifically 1 to 20 wt % based on the total weight of polysiloxane blocks and carbonate units. In a specific embodiment, the polysiloxane blocks are present in an amount of 1 to 10 wt %, specifically 2 to 9 wt %, and more specifically 3 to 8 wt %, based on the total weight of polysiloxane blocks and carbonate units.

Polysiloxane-polycarbonates further comprise carbonate units of formula (A) derived from a dihydroxy aromatic compound of formula (H). In an exemplary embodiment, the dihydroxy aromatic compound is bisphenol A. In an embodiment, the carbonate units comprising the polysiloxane-polycarbonate are present in an amount of 70 to 99.85 wt %, specifically 75 to 99.5, and more specifically 80 to 99 wt % based on the total weight of polysiloxane blocks and carbonate units. In a specific embodiment, the carbonate units are present in an amount of 90 to 99 wt %, specifically 91 to 98 wt %, and more specifically 92 to 97 wt %, based on the total weight of polysiloxane blocks and carbonate units.

d. UV Stabilizers

The photoresistant composition may further comprise a UV stabilizer for improved performance in UV stabilization. UV stabilizers disperse the UV radiation energy by absorbing the energy through reversible chemical rearrangements such as hydrogen shifts.

UV stabilizers may be hydroxybenzophenones, hydroxyphenyl benzotriazoles, cyanoacrylates, oxanilides, and hydroxyphenyl triazines. UV stabilizers may include, but are not limited to, poly[(6-morphilino-s-triazine-2,4-diyl)[2,2,6,6-tetramethyl-4-piperidyl)imino]-hexamethylene[(2,2,6,6-tetramethyl-4-piperidyl)imino], 2-hydroxy-4-octloxybenzophenoe (Uvinul®3008), 6-tert-butyl-2-(5-chloro-2H-benzotriazole-2-yl)-4-methylphenyl (Uvinul® 3026), 2,4-di-tert-butyl-6-(5-chloro-2H-benzotriazole-2-yl)-phenol (Uvinul®3027), 2-(2H-benzotriazole-2-yl)-4,6-di-tert-pentylphenol (Uvinul®3028), 2-(2H-benzotriazole-2-yl)-4-(1,1,3,3-tetramethylbutyl)-phenol (Uvinul® 3029), 1,3-bis[(2'-cyano-3',3'-diphenylacryloyl)oxy]-2,2-bis-{[(2'-cyano-3',3'-diphenylacryloyl)oxy]methyl}-propane (Uvinul® 3030), 2-(2H-benzotriazole-2-yl)-4-methylphenol (Uvinul® 3033), 2-(2H-bezhotriazole-2-yl)-4,6-bis(1-methyl-1-phenyethyl) phenol (Uvinul® 3034), ethyl-2-cyano-3,3-diphenylacrylate (Uvinul® 3035), (2-ethylhexyl)-2-cyano-3,3-diphenylacrylate (Uvinul® 3039), N,N'-bisformyl-N,N'-bis(2,2,6,6-tetramethyl-4-piperidinyl)hexamethylendiamine (Uvinul® 4050H), bis-(2,2,6,6-tetramethyl-4-pipieridyl)-sebacate (Uvinul® 4077H), bis-(1,2,2,6,6-pentamethyl-4-piperdiyl)-sebacate+methyl-(1,2,2,6,6-pentamethyl-4-piperidyl)-sebacate (Uvinul® 4092H) or combination thereof.

The photoresistant composition may comprise one or more UV stabilizers, excluding Cyasorb 5411, Cyasorb UV-3638, Uvinul 3030, and/or Tinuvin 234.

e. Colorants

Colorants such as pigment and/or dye additives may be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 parts by weight, based on 100 parts by weight of the polymer component of the thermoplastic composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the polymer component of the thermoplastic composition.

4. Mixers and Extruders

Compositions comprising the cyanophenyl endcapped branched polycarbonates and heat stabilizers can be manufactured by various methods. For example, cyanophenyl endcapped polycarbonate and heat stabilizers may be first blended in a high speed HENSCHEL-Mixer®. Other low shear processes, including but not limited to hand mixing, can also accomplish this blending. The blend may then be fed into the throat of a single or twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

5. Articles

Shaped, formed, or molded articles comprising the polycarbonate resin compositions are provided herein. The compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, Light Emitting Diodes (LEDs) and light panels, extruded film and sheet articles, and the like. The compositions are of particular utility in the manufacture of thin walled articles such as housings for electronic devices. Additional examples of articles that can be formed from the compositions include electrical parts, such as relays, and enclosures, consumer electronics such as enclosures and parts for laptops, desktops, docking stations, PDAs, digital cameras, desktops, and telecommunications parts such as parts for base station terminals.

The article may have a UL94 V0 flame rating at a thickness of between 1 mm and 2.5 mm or at 2.5 mm or at 1.5 mm or at 1 mm.

6. Functional Characteristics of Polycarbonate Resin and Article

Articles molded from the polycarbonate resin compositions comprising the cyanophenyl endcapped polycarbonates may have a heat deflection temperature (HDT) of 100 to 300° C., more specifically 110 to 200° C., measured at 0.455 MPa according to ASTM D648.

Articles molded from the polycarbonate resin compositions comprising the cyanophenyl endcapped polycarbonates can further have a percent ductility of 10 to 100%, or 20 to 100%, measured in accordance with ASTM 256. In other embodiments, where a branching agent is used, articles molded from thermoplastic composition comprising the cyanophenyl endcapped polycarbonates can further have a percent ductility of 0 to 100%, or 20 to 100%, measured in accordance with ASTM 256.

Articles molded from the polycarbonate resin compositions comprising the cyanophenyl endcapped polycarbonates can have a Notched Izod Impact (NII) of 1 to 15 feet to pounds (ft-lb)/inch, or 2 to 14 ft-lb/inch, measured at 23° C. using ⅛-inch thick bars (3.2 mm) in accordance with ASTM D256. In other embodiments, where a branching agent is used, articles molded from thermoplastic compositions comprising the cyanophenyl endcapped polycarbonates can have a Notched Izod Impact (NII) of 0.2 to 15 feet to pounds (ft-lb)/inch, or 0.5 to 14 ft-lb/inch, measured at 23° C. using ⅛-inch thick bars (3.2 mm) in accordance with ASTM D256.

Articles molded from compositions comprising the cyanophenyl endcapped polycarbonates can have a transparency of 60 to 90%, or more specifically, 70 to 90%, measured using 3.2 mm thick plaques according to ASTM-D1003-00. The thermoplastic compositions can have a haze value of less than 10%, more specifically, less than 5%, as measured using 3.2 mm thick plaques according to ASTM-D1003-00.

The articles molded from the polycarbonate resin composition can have a haze value of less than 5%, more specifically, less than 3%, as measured using 3.2 mm thick plaques according to ASTM-D1003-00. Additionally, the thermoplastic compositions can have a haze value of less than 20%, more specifically, less than 10%, even more specifically, less than 6% as measured using 3.2 mm thick plaques according to ASTM-D1003-00.

The articles molded from the polycarbonate resin composition may have a yellowing index of less than 3. Haze (%) and light transmission (%) may be determined using 3.2 mm molded plaques according to ASTM D1003-00. Yellowness index (YI) may be determined according to ASTM D1925-70.

The polycarbonate resin may have a viscosity build of less than 25%, less than 20%, less than 15%, or less than 10%.

Melt viscosity may be measured using a rheometric method. For example, melt viscosity values for a resin may be obtained on a rheometer. The percent viscosity change after a certain length of time may be determined from a graph of the melt viscosity change as a function of time during a rheometric test. For example, the percentage viscosity change (% Viscosity) may be determined by applying the following equation:

$$\% \text{ Viscosity} = (V_{30\,minutes} - V_{initial})/V_{initial} \times 100$$

wherein $V_{30\,minutes}$ is the melt viscosity measured at 300° C. after 30 minutes, $V_{initial}$ is the initial melt viscosity at 300° C. reported by the rheometer. 30 minutes is only an example of the length of time over which the percent viscosity change may be measured.

Resistance to heat discoloration may be evaluated by a difference between the Yi value of a control article, such as an article subjected to regular conditions, and the Yi value of a test article that is subjected to abusive conditions. The smaller the difference between a Yi value of the test article and a Yi value of the control article is, the more highly resistance to heat discoloration is evaluated.

Abusive conditions may include subjecting the polycarbonate resin and/or article derived from the resin to increased temperatures for a period of time. The abusive conditions may reflect associated with molding and/or extruding processes. For example, abusive conditions may include subjecting the polycarbonate resin or article to a temperature of greater than 300° C., of greater than 325° C., or of greater than 350° C. The polycarbonate resin or article may be subjected to the increased temperature for a period of time greater than 1 minute, greater than 2 minutes, greater than 3 minutes, greater than 4 minutes, greater than 5 minutes, greater than 6 minutes, greater than 7 minutes, greater than 8 minutes, greater than 9 minutes, greater than 10 minutes, greater than 15 minutes, greater than 20 minutes, greater than 25 minutes, greater than 30 minutes, greater than 35 minutes, greater than 40 minutes, greater than 50 minutes, or greater than 60 minutes.

Regular conditions may include subjecting the polycarbonate resin and/or article derived from the resin to temperatures less than those determined to be abusive temperatures for a period of time.

The resin may have a viscosity of at least 100 Poise, at least 200 Poise, at least 300 Poise, at least 400 Poise at 300° C., or at least 500 Poise at 300° C.

The present invention can be utilized as illustrated by the following non-limiting example.

Example 1

Stabilized Polycarbonates I

Polycarbonate samples for Yi and rheology testing were prepared by blending different molecular weight grades of branched and linear LEXAN® polycarbonate resins so as to achieve different melt flows. All compositions included 0.27 pph of tetra-stearate mold release, 0.27 pph of benzotriazole UV stabilizer, 0.08 pph of Rimar salt FR additive. The powder blend samples were extruded at a temperature profile of 230° C. to 290° C. and cut into pellets. The melt viscosity increase of the pellets for each sample was measured. Some pellets samples were injection molded at a temperature of 300° C. into color chips. The relative injection pressure was recorded during the molding. The initial yellowing index of molded chips, as well as the yellowing index of the molded chips after a 7 minute time cycle, was recorded using the ASTM D1925-70 test method. All the color chips had a thickness of 2.54 mm.

The results of these experiments are summarized in Table 1. As shown, formulations that incorporate the cyclic siloxane additive in combination with Doverphos S-9228 and IRGAPHOS® 168 stabilizers show low to none melt viscosity build-up, lower injection pressure, lower injection pressure increase after 7 minutes at 330° F., and low Yi values. Example 2 shows for instance low Yi and viscosity build-up values as compared to Example 3.

TABLE 1

Blends Characteristics and Properties

| components | | Ex-1 | Ex-2 | Ex-3 | Ex-4 | Ex-5 | Ex-6 | Ex-7 | Ex-8 |
|---|---|---|---|---|---|---|---|---|---|
| HBN 3% THPE Branched Resin | % | 27 | 47 | 47 | 27 | 27 | 27 | 27 | 27 |
| High Flow Polycarbonate | % | 10 | 29 | 29 | 10 | 10 | 10 | 10 | 10 |
| Ultra-high Flow Polycarbonate | % | 63 | | | 63 | 63 | 63 | 63 | 63 |
| Low Flow Polycarbonate | % | | 2 | 2 | | | | | |
| Branched Polycarbonate | % | | 22 | 22 | | | | | |
| DOVERPHOS ® S-9228 | % | 0.017 | 0.017 | | | 0.06 | | 0.017 | 0.028 |
| IRGAPHOS ® 168 | % | 0.014 | 0.014 | 0.06 | | | 0.06 | 0.014 | 0.028 |
| Hindered phenol | % | 0.050 | 0.050 | 0.027 | 0.027 | 0.027 | 0.027 | 0.050 | 0.024 |

TABLE 1-continued

Blends Characteristics and Properties

| components | | Ex-1 | Ex-2 | Ex-3 | Ex-4 | Ex-5 | Ex-6 | Ex-7 | Ex-8 |
|---|---|---|---|---|---|---|---|---|---|
| Release agent | % | 0.27 | 0.27 | 0.27 | 0.27 | 0.27 | 0.27 | 0.27 | 0.27 |
| UV additive | % | 0.27 | 0.27 | 0.27 | 0.27 | 0.27 | 0.27 | 0.27 | 0.27 |
| FR additive | % | 0.08 | 0.08 | 0.08 | 0.08 | 0.08 | 0.08 | 0.08 | 0.08 |
| Linear siloxane additive | % | 0.4 | 0.4 | 0.4 | 0.4 | 0.4 | 0.4 | 0.4 | 0.4 |
| Cyclic siloxane additive | % | 0.1 | 0.1 | 0.1 | 0.1 | 0.1 | 0.1 | 0.1 | 0.1 |
| Properties | | | | | | | | | |
| Initial Yellowing Index (Yi) | — | 2.24 | 2.48 | 3.16 | 3.13 | 2.38 | 2.23 | 2.12 | 2.09 |
| Yellowing Index after 7 min at 330° F. | — | 4.50 | 5.92 | 10.01 | 6.50 | 5.98 | 5.06 | 4.63 | 4.12 |
| Injection pressure | PSI | 225 | 474 | 557 | 258 | 230 | 222 | 228 | 234 |
| Injection pressure after 7 min at 330° F. | PSI | 246 | 532 | 643 | 256 | 204 | 244 | 250 | 249 |
| Melt Viscosity increase after 30 min at 300° C. | % | −9 | 8 | 44 | −6 | −7 | −6 | −8 | −6 |

The above-identified examples, and examples shown in other tables contained herein, may contain more than 100 weight percent of total components. With respect to Examples 1, 4, 5, 6, 7 and 8 of Table 1, the importance of the combination of both stabilizers (IRGAPHOS® 168 and DOVERPHOS® S-9228) in order to reach low Yi values is illustrated. The viscosity build-up is not significant because the relative amount of branched resin is low compared to Examples 2 and 3.

With respect to Examples 2 and 3, these examples show clearly that the combination of stabilizers in presence of the cyclic siloxane allows reaching low Yi and viscosity values.

Melt Viscosity values on resin pellets were obtained on a dynamic rheometer using a Rheometrics ARES with a parallel plates fixture at a heating rate at 10° C./min at a frequency of 3 rad/s and strain amplitude of 9% and heated by hot air. The percentage viscosity change after 30 minutes was determined from a graph of the melt viscosity change as a function of time during the rheometric test. The percentage viscosity change (% Viscosity) was determined by applying the following equation:

% Viscosity=$(V_{30\ minutes}-V_{initial})/V_{initial})\times 100$ wherein $V_{30\ minutes}$ is the melt viscosity measured at 300° C. after 30 minutes, $V_{initial}$ is the initial melt viscosity at 300° C. reported by the instrument.

Example 2

Stabilized Polycarbonates II

Polycarbonate samples for rheology testing were prepared by blending different molecular weight grades of branched and linear LEXAN® polycarbonate resins so as to achieve different melt flows. As shown in Table 2, blend formulations varied by the nature of the additives in the formulations. Examples 11, 12, 13, 14, 15 and 18 did incorporate 0.08% of fire retardant Rimar salt compared to Examples 10, 16 and 17, which did not. Examples 12, 14, 15, 17 and 18 did incorporate 0.4% of linear siloxane additive compared to Examples 9, 10, 12 and 15, which did not. Finally, all the examples incorporated 0.1% of cyclic siloxane additive except Examples 9 and 10. The powder blend samples were extruded at a temperature profile of 230° C. to 290° C. and cut into pellets. The melt viscosity increase of the pellets for each sample was measured.

The results of these experiments are summarized in Table 2. As shown, formulations of Examples 9, 10 and 11, which do not incorporate siloxane additive, exhibit high values of viscosity build-up. Also, the mold release agent do not show any influence on the resulting melt viscosity increase when comparing Examples 9 and 10. Examples 12, 14 and 18 have identical formulations. Similar melt viscosity build-up was noticed for Examples 12, 14 and 18.

Table 2 shows that blends that incorporate both the fire retardant Rimar salt and cyclic siloxane exhibit the lowest values of melt viscosity build-up. The addition of linear siloxane as shown in Examples 12, 14 and 18 do not affect the increase in viscosity.

TABLE 2

Blends Characteristics and Properties

| components | | Ex-9 | Ex-10 | Ex-11 | Ex-12 | Ex-13 | Ex-14 | Ex-15 | Ex-16 | Ex-17 | Ex-18 |
|---|---|---|---|---|---|---|---|---|---|---|---|
| HBN 3% THPE Branched Resin | % | 47 | 47 | 47 | 50 | 50 | 50 | 50 | 50 | 50 | 50 |
| High Flow Polycarbonate | % | 29 | 29 | 29 | 2 | 2 | 2 | 2 | 2 | 2 | 2 |
| Low Flow Polycarbonate | % | 2 | 2 | 2 | 19 | 19 | 19 | 19 | 19 | 19 | 19 |
| Branched Polycarbonate | % | 22 | 22 | 22 | 28 | 28 | 28 | 28 | 28 | 28 | 28 |
| DOVERPHOS ® S-9228 | % | 0.017 | 0.017 | 0.017 | 0.017 | 0.017 | 0.017 | 0.017 | 0.017 | 0.017 | 0.017 |
| IRGAPHOS ® 168 | % | 0.014 | 0.014 | 0.014 | 0.014 | 0.014 | 0.014 | 0.014 | 0.014 | 0.014 | 0.014 |
| Hindered phenol | % | 0.05 | 0.05 | 0.05 | 0.05 | 0.05 | 0.05 | 0.05 | 0.05 | 0.05 | 0.05 |

TABLE 2-continued

Blends Characteristics and Properties

| components | | Ex-9 | Ex-10 | Ex-11 | Ex-12 | Ex-13 | Ex-14 | Ex-15 | Ex-16 | Ex-17 | Ex-18 |
|---|---|---|---|---|---|---|---|---|---|---|---|
| Release agent | % | 0.27 | 0.27 | 0.27 | 0.27 | 0.27 | 0.27 | 0.27 | 0.27 | 0.27 | 0.27 |
| UV additive | % | | 0.27 | 0.27 | | | | | | | |
| FR additive | % | | | 0.08 | 0.08 | 0.08 | 0.08 | 0.08 | | | 0.08 |
| Linear siloxane additive | % | | | | 0.40 | | 0.40 | 0.40 | | 0.40 | 0.40 |
| Cyclic siloxane additive | % | | | | 0.10 | 0.10 | 0.10 | 0.00 | 0.10 | 0.10 | 0.10 |
| Properties | | | | | | | | | | | |
| Melt Viscosity increase after 30 min at 300° C. | % | 57 | 66 | 57 | 12 | 6 | 12 | 26 | 36 | 46 | 17 |

Example 3

Stabilized Polycarbonates III

Polycarbonate samples for Yi and rheology testing were prepared by blending different molecular weight grades of branched and linear LEXAN® polycarbonate resins as shown in Table 3. As shown in Table 3, the amounts of DOVERPHOS® S-9228, IRGAPHOS® 168 and hindered phenol additives were varied in the blend formulations. The powder blend samples were extruded at a temperature profile of 230° C. to 290° C. and cut into pellets. The melt viscosity increase of the pellets for each sample was measured. Some pellets samples were injection molded at a temperature of 300° C. into color chips. The initial yellowing index of molded chips was recorded using the ASTM D1925-70 test method. All the color chips had a thickness of 3.2 mm.

The results of these experiments are summarized in Table 3. As shown, amounts as low as 0.005%, 0.016% and 0.015% for IRGAPHOS® 168, DOVERPHOS® S-9228 and hindered phenol stabilizers respectively lead to improved Yi and/or melt-viscosity build-up.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims. The appended claims should be construed broadly and in a manner consistent with the spirit and the scope of the invention herein.

We claim:

1. A polycarbonate resin composition comprising
   47-50 wt % of a first branched polycarbonate that is a bisphenol-A polycarbonate resin having a carbonate end-capping group derived from p-hydroxybenzonitrile (HBN) and branching derived from tris-(hydroxyphenyl)ethane (THPE) as a branching agent;
   22-28 wt % of a second branched polycarbonate that is a bisphenol-A polycarbonate resin having branching derived from tris-(hydroxyphenyl)ethane (THPE) as a branching agent;

TABLE 3

Blends Characteristics and Properties

| components | | Ex-19 | Ex-20 | Ex-21 | Ex-22 | Ex-23 | Ex-24 | Ex-25 | Ex-26 | Ex-27 |
|---|---|---|---|---|---|---|---|---|---|---|
| HBN 3% THPE Branched Resin | % | 50 | 50 | 50 | 50 | 50 | 50 | 50 | 50 | 50 |
| High Flow Polycarbonate | % | 2 | 2 | 2 | 2 | 2 | 2 | 2 | 2 | 2 |
| Low Flow Polycarbonate | % | 19 | 19 | 19 | 19 | 19 | 19 | 19 | 19 | 19 |
| Branched Polycarbonate | % | 28 | 28 | 28 | 28 | 28 | 28 | 28 | 28 | 28 |
| DOVERPHOS ® S-9228 | % | 0.005 | 0.005 | 0.044 | 0.032 | 0.016 | 0.060 | 0.030 | 0.028 | 0.018 |
| IRGAPHOS ® 168 | % | 0.032 | 0.005 | 0.018 | 0.005 | 0.016 | 0.005 | 0.016 | 0.028 | 0.044 |
| Hindered phenol | % | 0.042 | 0.070 | 0.018 | 0.042 | 0.047 | 0.015 | 0.033 | 0.024 | 0.018 |
| Release agent | % | 0.27 | 0.27 | 0.27 | 0.27 | 0.27 | 0.27 | 0.27 | 0.27 | 0.27 |
| UV additive | % | 0.27 | 0.27 | 0.27 | 0.27 | 0.27 | 0.27 | 0.27 | 0.27 | 0.27 |
| FR additive | % | 0.08 | 0.08 | 0.08 | 0.08 | 0.08 | 0.08 | 0.08 | 0.08 | 0.08 |
| Cyclic siloxane additive | % | 0.10 | 0.10 | 0.10 | 0.10 | 0.10 | 0.10 | 0.10 | 0.10 | 0.10 |
| Properties | | | | | | | | | | |
| Melt Viscosity increase after 30 min at 300° C. | % | 89 | 84 | 63 | 35 | 18 | 58 | 64 | 70 | 51 |
| Yi (3.2 mm) | — | 3.5 | 3.8 | 3 | 2.9 | 2.9 | 2.9 | 2.8 | 2.75 | 2.75 |

As shown in Table 1 and 2, the amounts of IRGAPHOS® 168, DOVERPHOS® S-9228 and hindered phenol stabilizers for which the Yi and/or the melt viscosity build-up improved can reach as high as 0.028%, 0.060% and 0.050% respectively.

21-31 wt % of a high flow polycarbonate that is a bisphenol-A polycarbonate homopolymer having a melt volume flow rate (MVR) of between 21.9 and 31.8 cm$^3$/10 min, and a low flow polycarbonate that is a bisphenol-A polycarbonate homopolymer having a melt volume flow rate (MVR) of between 5 and 7 cm³/10 min;
0.014-0.016 wt % of a first heat stabilizer that is tris(2,4-di-t-butylphenyl)phosphite;
0.016-0.017 wt % of a second heat stabilizer that is bis(2,4-dicumylphenyl)pentaerythritol diphosphite;
a cyclic siloxane;
a flame retardant salt; and
0.047-0.05 wt % of a hindered phenol heat stabilizer.

2. The resin composition of claim 1, wherein the cyclic siloxane is at least one of the following: octaphenylcyclotetrasiloxane, hexamethylcyclotrisiloxane, octamethylcyclotetrasiloxane, decamethylcyclopentasiloxane, dodecmethylcyclohexasiloxane, trimethyltriphenylcyclotrisiloxane, and/or tetramethyltetraphenylcyclotetrasiloxane.

3. The resin composition of claim 1, wherein the cyclic siloxane is octaphenylcyclotetrasiloxane.

4. The resin composition of claim 1, comprising 0.05-0.1 wt % of the cyclic siloxane.

5. The resin composition of claim 1, wherein the flame retardant salt is at least one of the following: alkali metal salt of perfluorinated $C_1$-$C_{16}$ alkyl sufonates; potassium perfluorobutane sulfonate; potassium perfluoroctane sulfonate; tetraethylammonium perfluorohexane sulfonate; sodium toluene sulfonate; sodium diphenylsulfone sulfonate; and potassium diphenylsulfone sulfonate.

6. The resin composition of claim 1, wherein the flame retardant salt is potassium perfluorobutane sulfonate.

7. The resin composition of claim 1, comprising 0.05-0.1 wt % of the flame retardant salt.

8. The resin composition of claim 1, wherein the cyclic siloxane is octaphenylcyclotetrasiloxane that is present in the composition at 0.05-0.1 wt %, and the flame retardant salt is potassium perfluorobutane sulfonate that is present in the composition at 0.05-0.1 wt %.

9. The resin composition of claim 1, wherein the hindered phenol heat stabilizer is octadecyl-3(3,5-ditertbutyl-4-hydroxyphenyl)propionate.

10. The resin composition of claim 1, further comprising a release agent.

11. The resin composition of claim 1, further comprising a UV additive.

12. The resin composition of claim 1, further comprising a linear siloxane having the formula:

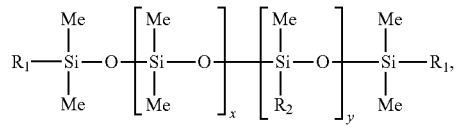

wherein $R_{23}$ is a $C_1$-$C_{18}$ alkyl group, $R_{24}$ is a phenyl, and $x_1$ and $y_1$ sum to 1.

13. The resin composition of claim 1, wherein the resin composition has a viscosity of at least 500 Poise at 300° C.

14. The resin composition of claim 1, wherein the resin composition has a viscosity build of no greater than 20% after 30 minutes at 300° C.

15. The resin composition of claim 1, wherein the resin composition has a viscosity build of no greater than 15% after 30 minutes at 300° C.

16. The resin composition of claim 1, wherein the resin composition has a viscosity build of no greater than 10% after 30 minutes at 300° C.

17. The resin composition of claim 1, wherein a 3.2 mm thick article formed from the composition has a yellowing index (Yi) of less than 3.

18. The polycarbonate resin composition of claim 1, wherein a 3.2 mm thick article formed from the composition has a yellowing index (Yi) of less than 2.5.

19. A polycarbonate resin composition, selected from the group consisting of (a)-(c):
(a) a polycarbonate resin composition comprising: 47 wt % of first branched polycarbonate that is a bisphenol-A polycarbonate resin having a carbonate end-capping group derived from p-hydroxybenzonitrile (HBN) and branching derived from tris-(hydroxyphenyl)ethane (THPE) as a branching agent; 22 wt % of a second branched polycarbonate that is a bisphenol-A polycarbonate resin having branching derived from tris-(hydroxyphenyl)ethane (THPE) as a branching agent; 29 wt % of a high flow polycarbonate that is a bisphenol-A polycarbonate homopolymer having a melt volume flow rate (MVR) of between 21.9 and 31.8 cm³/10 min; 2 wt % of a low flow polycarbonate that is a bisphenol-A polycarbonate homopolymer having a melt volume flow rate (MVR) of between 5 and 7 cm³/10 min; 0.014 wt % of a first heat stabilizer that is tris(2,4-di-t-butylphenyl) phosphite; 0.017 wt % of a second heat stabilizer that is bis(2,4-dicumylphenyl)pentaerythritol diphosphite; 0.1 wt % of a cyclic siloxane; 0.08 wt % of a flame retardant salt; and 0.05 wt % of a hindered phenol heat stabilizer;
(b) a polycarbonate resin composition comprising: 50 wt % of first branched polycarbonate that is a bisphenol-A polycarbonate resin having a carbonate end-capping group derived from p-hydroxybenzonitrile (HBN) and branching derived from tris-(hydroxyphenyl)ethane (THPE) as a branching agent; 28 wt % of a second branched polycarbonate that is a bisphenol-A polycarbonate resin having branching derived from tris-(hydroxyphenyl)ethane (THPE) as a branching agent; 2 wt % of a high flow polycarbonate that is a bisphenol-A polycarbonate homopolymer having a melt volume flow rate (MVR) of between 21.9 and 31.8 cm³/10 min; 19 wt % of a low flow polycarbonate that is a bisphenol-A polycarbonate homopolymer having a melt volume flow rate (MVR) of between 5 and 7 cm³/10 min; 0.014 wt % of a first heat stabilizer that is tris(2,4-di-t-butylphenyl) phosphite; 0.017 wt % of a second heat stabilizer that is bis(2,4-dicumylphenyl)pentaerythritol diphosphite; 0.1 wt % of a cyclic siloxane; 0.08 wt % of a flame retardant salt; and 0.05 wt % of a hindered phenol heat stabilizer; and
(c) a polycarbonate resin composition comprising: 50 wt % of first branched polycarbonate that is a bisphenol-A polycarbonate resin having a carbonate end-capping group derived from p-hydroxybenzonitrile (HBN) and branching derived from tris-(hydroxyphenyl)ethane (THPE) as a branching agent; 28 wt % of a second branched polycarbonate that is a bisphenol-A polycarbonate resin having branching derived from tris-(hydroxyphenyl)ethane (THPE) as a branching agent; 2 wt % of a high flow polycarbonate that is a bisphenol-A polycarbonate homopolymer having a melt volume flow rate (MVR) of between 21.9 and 31.8 cm³/10 min; 19 wt % of a low flow polycarbonate that is a bisphenol-A polycarbonate homopolymer having a melt volume flow rate (MVR) of between 5 and 7 cm³/10 min; 0.016 wt % of a first heat stabilizer that is tris(2,4-di-t-butylphenyl) phosphite; 0.016 wt % of a second heat stabilizer that is bis(2,4-dicumylphenyl)pentaerythritol diphosphite; 0.1 wt % of a cyclic siloxane; 0.08 wt % of a flame retardant salt; and 0.047 wt % of a hindered phenol heat stabilizer.

20. The polycarbonate composition of claim 19, further comprising 0.4 wt % of a linear siloxane additive.

21. The polycarbonate composition of claim 19, further comprising 0.27 wt % of a UV additive.

22. The polycarbonate composition of claim 19, further comprising 0.27 wt % of a release agent.

* * * * *